United States Patent
Ishibashi et al.

(10) Patent No.: US 6,949,135 B2
(45) Date of Patent: Sep. 27, 2005

(54) INK-JET INK, INK-JET RECORDING METHOD AND RECORDED IMAGING MATERIAL USING THEREOF

(75) Inventors: Daisuke Ishibashi, Hino (JP); Emi Takayama, Hachioji (JP); Michiko Ohkubo, Hachioji (JP)

(73) Assignee: Konica Corporation, Tokyo (JP)

( * ) Notice: Subject to any disclaimer, the term of this patent is extended or adjusted under 35 U.S.C. 154(b) by 93 days.

(21) Appl. No.: 10/462,125

(22) Filed: Jun. 16, 2003

(65) Prior Publication Data

US 2004/0003754 A1 Jan. 8, 2004

(30) Foreign Application Priority Data

Jun. 26, 2002 (JP) ......................... 2002-185983

(51) Int. Cl.$^7$ ...................... C09D 11/02; C07D 221/18; B41J 2/01
(52) U.S. Cl. ................ 106/31.47; 106/31.58; 546/76; 347/100
(58) Field of Search ............. 106/31.47, 31.58; 546/76; 347/100

(56) References Cited

U.S. PATENT DOCUMENTS

| | | | | |
|---|---|---|---|---|
| 6,460,988 B1 | * | 10/2002 | Mafune et al. | 347/100 |
| 6,530,985 B1 | * | 3/2003 | Matsumoto et al. | 106/31.47 |
| 6,648,952 B1 | * | 11/2003 | Matsumoto et al. | 106/31.47 |
| 6,685,768 B2 | * | 2/2004 | Blease et al. | 106/31.47 |
| 6,706,102 B2 | * | 3/2004 | Blease et al. | 106/31.47 |
| 2003/0061963 A1 | * | 4/2003 | Blease et al. | 106/31.27 |
| 2003/0070580 A1 | * | 4/2003 | Blease et al. | 106/31.27 |
| 2004/0134383 A1 | * | 7/2004 | Matsumoto et al. | 106/31.47 |

FOREIGN PATENT DOCUMENTS

| | | |
|---|---|---|
| EP | 1067155 | 1/2001 |
| EP | 1123932 | 8/2001 |
| EP | 1209204 | 5/2002 |
| EP | 1063268 | 12/2002 |
| JP | 08029771 | * 2/1996 |

OTHER PUBLICATIONS

English translation of JP08/029771, Feb. 1996.*
European Search Report EP 03 25 3896, Sep. 2003.
One page Patent Abstracts of Japan, Publication #08029771, Publication Date: Feb. 2, 1996 English Abstract.

* cited by examiner

*Primary Examiner*—Helene Klemanski
(74) *Attorney, Agent, or Firm*—Lucas & Mercanti, LLP

(57) ABSTRACT

An ink-jet ink comprising water, a water-soluble organic solvent and a water-soluble dye, wherein the water-soluble dye is an anthrapyridone compound represented by Formula (1) or Formula (2):

Formula (1)

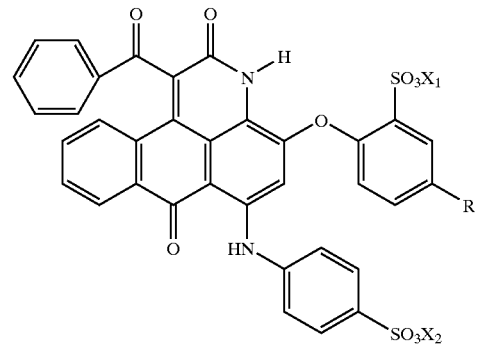

Formula (2)

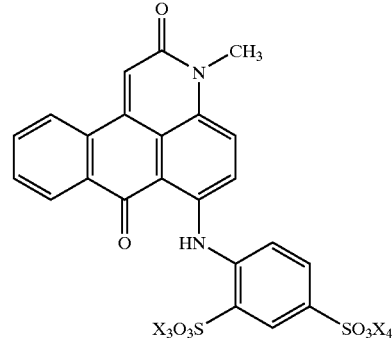

10 Claims, No Drawings

INK-JET INK, INK-JET RECORDING METHOD AND RECORDED IMAGING MATERIAL USING THEREOF

TECHNICAL FIELD

The present invention is related to an ink-jet ink, an ink-jet recording method and a recorded imaging material using thereof.

BACKGROUND

With regard to a liquid ink-jet recording solution, required is that it conforms with the used recording method, its image tone is good at high recording image density, it can be fixed to the printed medium without bleeding after printing, it is superior in stability as ink, it has no problems of toxicity and inflammability, and its cost is low. From these points of view, many ink-jet inks and the recording methods have been proposed and investigated, resulting in that a quite limited ink-jet recording liquid solution which only satisfies some of the requirements at the same time.

As to color image requiring yellow, magenta, cyan and black, commonly known dyes and pigments having C. I. (Color Index) Numbers described in the C. I. have been widely investigated. Specifically, with regard to magenta ink-jet recording liquid solutions, those, which are using xanthene types (such as C. I. Red 52) or azo types (such as C. I. Acid Red 249) water-soluble dyes, are widely known, but generally have problems of color fading in light and other problems.

Further, it does not become a problem with sheets for ink-jet use, but it is commonly known that uneven bleeding is generated in the fringes of images with sheets for non-ink-jet use such as plain copying paper.

SUMMARY

An object of the present invention is to provide an ink-jet ink, specifically targeting a magenta color ink-jet ink, which exhibits superiority in colored image stability in light and exhibits no bleeding on plain paper, and to provide an ink-jet recording method and recorded images thereof.

The foregoing object of the present invention was achieved employing the embodiments below.

1. An ink-jet ink comprising water, a water-soluble organic solvent and a water-soluble dye, wherein the water-soluble dye is represented by Formula (1) or Formula (2):

Formula (1)

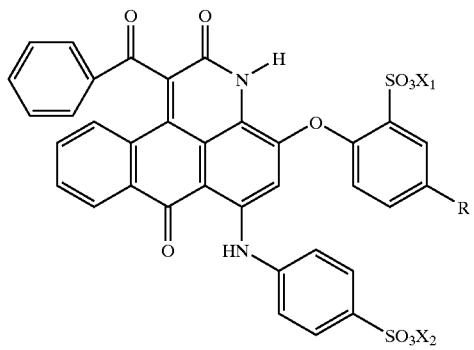

wherein R represents an alkyl group, each $X_1$ and $X_2$ independently represents an alkali metal, an alkaline earth metal, an alkylamine quaternary salt, an alkanolamine quaternary salt or ammonium, Formula (2)

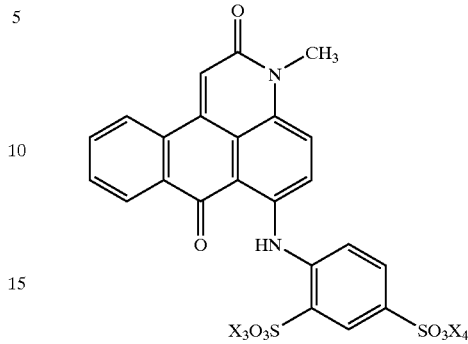

wherein each $X_3$ and $X_4$ independently represents an alkali metal, an alkaline earth metal, an alkylamine quaternary salt, an alkanolamine quaternary salt or ammonium.

2. The ink-jet ink of item 1, wherein the water-soluble dye is represented by Formula (1).

3. The ink-jet ink of item 1, wherein the water-soluble dye is represented by Formula (2).

4. The ink-jet ink of item 2, wherein the ink further comprises the water-soluble dye represented by Formula (2).

5. The ink-jet ink of item 4, wherein a weight ratio of the water-soluble dye represented by Formula (1) to the water-soluble dye represented by Formula (2) is from 1:4 to 4:1.

6. The ink-jet ink of item 1, wherein the water-soluble organic solvent is a 1,2-alkanediol.

7. The ink-jet ink of item 1, wherein the ink comprises a compound selected from the group consisting of an alkyl ether of diethylene glycol, an alkyl ether of triethylene glycol, an alkyl ether of tetraethylene glycol, an alkyl ether of propylene glycol, an alkyl ether of dipropylene glycol and an alkyl ether of tripropylene glycol.

8. The ink-jet ink of item 1, wherein the ink comprises a divalent alcohol with a branched alkyl chain.

9. The ink-jet ink of item 1, wherein the ink comprises a monovalent alcohol with 1 to 3 carbon atoms.

10. The ink-jet ink of item 1, wherein the ink comprises acetylene diol or an adduct compound of ethylene oxide with acetylene diol.

11. The ink-jet ink of item 1, wherein the ink comprises an adduct compound of ethylene oxide with polypropylene glycol.

12. An ink-jet recording method comprising a step of:
jetting the ink of item 1 onto a surface of a recording medium,
wherein the recording medium is a plain paper.

13. An ink-jet recording method comprising a step of:
jetting the ink of item 1 onto a surface of a recording medium,
wherein the recording medium comprises a support having thereon an ink receiving layer comprising a water-soluble binder.

14. The ink-jet recording method of item 13,
wherein the ink receiving layer has a porous structure.

15. The ink-jet recording method of item 12,
wherein the jetting step is conducted with an on-demand process.

16. The ink-jet recording method of item 15,
wherein the jetting step is conducted with an electro-mechanical conversion method.

17. The ink-jet recording method of item 15,
wherein the jetting step is conducted with an electro-thermal conversion method.

18. A recorded material obtained by using the ink-jet ink of item 1.

19. A recorded material obtained by using the ink-jet recording method of item 12.

DESCRIPTION OF THE PREFERRED EMBODIMENTS

The present invention will be detailed below. As a result of diligent investigation, the inventors of the present invention found that in an ink-jet ink comprising a water-soluble dye, using water and water-soluble solvents, the water-soluble dye containing a compound represented by Formula (1) exhibited superiority in color image stability in ambient light.

In Formula (1), $X_1$ and $X_2$ which may each be the same or different, represent alkaline metals (such as sodium, potassium and lithium), alkaline earth metals (such as calcium and magnesium), alkylamine quaternary salts (such as a quaternary salt of methylamine, ethylamine, dimethylamine, and diethylamine), alkanolamine quaternary salts (such as a quaternary salt of ethanolamine, diethanolamine, methylaminoethanol, and ethylaminoethanol) or ammoniums, of which preferred are alkaline metals or alkanolamine quaternary salts.

R represents an alkyl group exhibiting a straight or branched chain, however a branched alkyl group is preferable.

Compound represented by Formula (1) are exemplified below, but the present invention is not limited to these examples.

In Formula (2), $X_3$ and $X_4$ which may each be the same or different, represent alkaline metals (such as sodium, potassium and lithium), alkaline earth metals (such as calcium and magnesium), alkylamine quaternary salts (such as methylamine, ethylamine, dimethylamine, and diethylamine), alkanolamine quaternary salts (such as ethanolamine, diethanolamine, methylaminoethanol, and ethylaminoethanol) or ammoniums, of which preferred are alkaline metals or alkanolamine quaternary salts.

Compounds represented by Formula (2) are exemplified below, but the present invention is not limited to these examples.

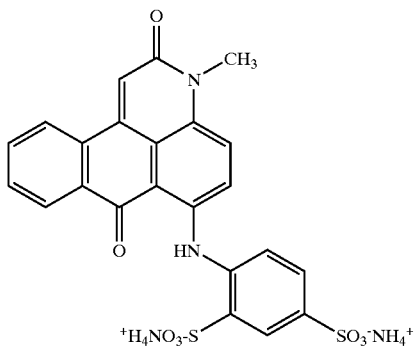

M-6

Compounds represented by Formulas (1) and (2) may each be used alone, but excellent magenta color can be reproduced using combinations of them. It is preferable to use them in ratios of 1:4–4:1, however it is more preferable to use the ratio of 1:2–2:1.

Further, as a result of diligent investigation, the inventors found that it was possible to obtain images exhibiting superiority in light stability and no bleeding on plain copying paper, using ink-jet recording liquid solutions containing a dye represented by Formulas (1) or (2) as a water-soluble dye, and containing 1,2-alkanediol as a water-soluble organic solvent.

Regarding 1,2-alkanediol, the number of carbons is preferably 4 or more, and 1,2-hexanediol or 1,2-pentanediol is more preferable.

Further, as a result of diligent investigation, the inventors found that it was possible to obtain images exhibiting superiority in light stability and no bleeding with plain copying paper, using ink-jet recording liquid solutions containing a dye represented by Formulas (1) or (2) as a water-soluble dye, and containing an alkyl ether of diethylene glycol, an alkyl ether of triethylene glycol, an alkyl ether of tetraethylene glycol, an alkyl ether of propylene glycol, an alkyl ether of dipropylene glycol, or an alkyl ether of tripropylene glycol as an organic water-soluble solvent.

Examples of an alkyl ether of diethylene glycol, an alkyl ether of triethylene glycol, an alkyl ether of tetraethylene glycol, an alkyl ether of propylene glycol, an alkyl ether of dipropylene glycol, or an alkyl ether of tripropylene glycol include diethylene glycol monomethyl ether, diethylene glycol monoethyl ether, diethylene glycol monobutyl ether, triethylene glycol monomethyl ether, triethylene glycol dimethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monobutyl ether, dipropylene glycol methyl ether, dipropylene glycol monoethyl ether, dipropylene glycol monobutyl ether, tripropylene glycol monomethyl ether, tripropylene glycol monoethyl ether, and tripropylene glycol monobutyl ether.

Further, as a result of diligent investigation, the inventors found that it was possible to obtain images exhibiting superior light stability and no bleeding with plain copying paper, using ink-jet recording liquid solutions containing a dye represented by Formulas (1) or (2) as a water-soluble dye, and containing a divalent branched alcohol as an organic water-soluble solvent.

Examples of divalent alcohols include 2,2-dimethyl-1,3-propanediol, 2-methyl-2,4-pentanediol, 3-methyl-1,5-pentandiol, 3-methyl-1,3-butanediol, and 2-methyl-1,3-propanediol.

Further, as a result of diligent investigation, the inventors found that it was possible to obtain images exhibiting superior light stability and no bleeding on plain copying paper, using ink-jet recording liquid solutions containing a dye represented by Formulas (1) or (2) as a water-soluble dye, and containing an alcohol having 1–3 carbon atoms as an organic water-soluble solvent.

As monovalent alcohols with 1 to 3 carbon atoms, preferable are methanol, ethanol, 1-propanol, and 2-propanol, but more preferable is 2-propanol.

Further, as a result of the diligent investigation, the inventors found that it was possible to obtain images exhibiting superior light stability and no bleeding on plain copying paper, using ink-jet recording liquid solutions containing a dye represented by Formulas (1) or (2) as a water-soluble dye, and containing acetylene diol or an adduct compound of ethylene oxide with acetylene diol.

As acetylene diol or an adduct compound of ethylene oxide with acetylene diol, preferable are compounds represented by the following formula.

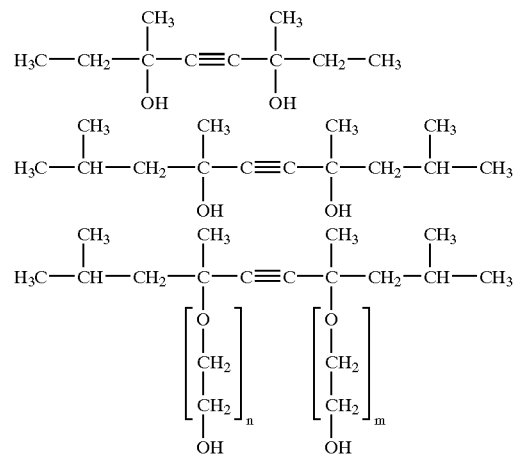

In these formulas, m and n represent integers. Further, examples of acetylene diol and an adduct compound of ethylene oxide with acetylene diol include Surfynol 82, Surfynol 104, Surfynol 440, Surfynol 465, and surfynol 485, which are produced by Air Products and Chemicals, Inc., but this invention is not limited to these examples.

Further, as a result of diligent investigation, the inventors found that it was possible to obtain images exhibiting superior light stability and no bleeding on plain copying paper, using ink-jet recording liquid solutions containing a dye represented by Formulas (1) or (2) as a water-soluble dye, and containing an ethylene oxide adduct of polypropylene glycol.

As an ethylene oxide adduct of polypropylene glycol, preferable are compounds represented by following Formula (3).

HO—$(C_2H_4O)x$-$(C_3H_6O)y$-$(C_2H_4O)z$-H    Formula (3)

In Formula, x, y and z represent integers, and y is preferably an integer of 12–60, and x+z is preferably an integer of 5–25.

Examples of the compounds represented by Formula (3) include ADEKA PLURONIC L 61, ADEKA PLURONIC L62, ADEKA PLURONIC L63, ADEKA PLURONIC L64, ADEKA PLURONIC L42, ADEKA PLURONIC L43, ADEKA PLURONIC L44, ADEKA PLURONIC L31, and ADEKA PLURONIC L34, which are produced by ASAHI DENKA CO., LTD., but this invention is not limited to these examples.

Examples of water-soluble organic solvents used in the ink-jet ink of this invention in addition to the forgoing organic water-soluble solvents, include polyvalent-alcohols (such as ethylene glycol, diethylene glycol, triethylene glycol, propylene glycol, dipropylene glycol, butylenes glycol, hexanediol, pentanediol, glycerine, hexanetriol and thiodiglycol); amines (such as ethanolamine, diethanol amine, triethanolamine, N-methyldiethanol amine, N-ethyldiethanolamine, morpholine, N-ethylmorpholine, ethylenediamine, diethylenediamine, diethylenetriamine, triethylenetetramine, tetraethylenepentanamine, polyethyleneimine, pentamethyldiethylenetriamine and tetramethylpropylenediamine); amides (such as formamide, N,N-dimethylformamide); heterocyclic compounds (such as 2-pyrrolidone, N-methyl-2-pyrrolidone, cyclohexyl-pyrrolidone, 2-oxazolidone and 1,3-dimethyl-2-imidazolidinone); sulfoxides (such as dimethylsuofoxide); sulfones (such as sulfolane); urea; acetonitrile and acetone.

In the ink-jet ink of this invention, other water-soluble dyes may also be used in combination, such as azo dyes, azomethine dyes, xanthene dyes, and quinone dyes. Specific compounds are listed below, however, this invention is not limited to these exemplified compounds.

[C.I. Acid Red]
1, 6, 8, 9, 13, 18, 27, 35, 37, 52, 54, 57, 73, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415;

[C.I. Direct Red]
2, 4, 9, 23, 24, 31, 54, 62, 69, 79, 80, 81, 83, 84, 89, 95, 212, 224, 225, 226, 227, 239, 242, 243, 254;

[C.I. Basic Red]
1, 2, 12, 13, 14, 15, 18, 23, 24, 27, 29, 35, 36, 39, 46, 51, 52, 69, 70, 73, 82, 109;

[C.I. Reactive Red]
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235.

In ink-jet ink of this invention, additional pigments may also be used in combination, such as azo pigments such as azolakes, insoluble azo pigments, condensed azo pigments, and chelate azo pigments; polycyclic pigments such as phthalocyanine pigments, perylene and perylene pigments, antraquinone pigments, quinacridone pigments, dioxadine pigments, isoindolinone pigments, and quinophthalone pigments; dye lakes such as basic dye type lakes and acid dye type lakes; and inorganic pigments. Concrete compounds of pigments are listed below, but this invention is not limited to these exemplified compounds.

[C.I. Pigment Red]
2, 3, 5, 6, 7, 15, 16, 48:1, 53:1, 57:1, 122, 123, 139, 144, 149, 166, 177, 178, 222.

the ink-jet ink of the present invention may further have added surface active agents to control the surface tension. As examples of surface active agents, anionic type, cationic type, ampholytic type, and nonionic type ones may be used, and typically, as anionic type surface active agents, listed may be aliphatic acid salts, alkyl sulfates, alkyl sulfate esters, alkylbenzenesulfonates, alkylnaphthalenesulfonates, dialkylsulfosuccinates, alkylphophate salts, alkylnaphthalenesulfonic acid formaline condensates, and polyoxyethylene alkylsulfate salts; as cationic type surface active agents, listed may be amine salts, tetraalkylquaternary ammonium salts, trialkylquaternary ammonium salts, alkylpyridinium salts, and alkylquinolinium salts; and as nonionic type surface active agents, listed may be polyoxyethylenealkyl ethers, polyoxyethylene propylene block polymers, polyozyethylene alkylphenyl ethers, polyoxyethylene aliphatic acid esters, polyoxyethylenesorbitane aliphatic acid esters, and polyoxyethylene alkylamines.

The added amount of these surface active agents depends on the type and amount of the dyes, water-soluble organic solvent and other additives, but is preferably in the range of 0.01–5 weight % to the total ink weight.

Further, various commonly known additives such as a viscosity controlling agent, a specific resistance controlling agent, a layer forming agent, an ultraviolet absorption agent, an anti-oxidation agent, a fungicide, a rust preventing agent, a pH adjusting agent, a dye dissolving aid, an anti-foam agent and a metal chelating agent may be added to the ink composition with the objective of improving the properties of the ink such as ejection stability, suitability to a print head or cartridge, and storage stability, as well as other properties.

The recording medium used in this invention is plain paper, but in order to obtain higher quality images, it is preferable to use recording media coated with a recording liquid receiving layer onto a support, and not to use only generally used office paper, represented by copying paper.

An ink receiving layer of the recording medium used in this invention contains a porous type receiving layer featuring pores and a so-called swelling type receiving layer not featuring such pores. In the case of a swelling type receiving layer, the ink receiving layer comprises a water absorptive resin, and the water absorptive resin incorporates a means to absorb ink solvents and dyes among the resin molecules. This type of an ink receiving layer is more preferable than the porous type from the viewpoint of image discoloration due to the dyes being not directly exposed to air.

A water absorptive resin may be a hydrophilic polymer such as polyvinyl alcohol, gelatin, polyethylene oxide, polyvinylpyrrolidone, casein, starch, agar, carageenan, polyacrylic acid, polymethacylic acid, polyacryl amide, polymethacrylic amide, polyatylenesulfonic acid, cellulose, hydroxyethyl cellulose, carboxyl methyl cellulose, hydroxylethylcellulose, dextran, dextrin, pullulan, and water-soluble polyvinyl butyral. These hydrophilic polymers may be used in combinations of more than two kinds.

The preferably used hydrophilic polymer in this invention is polyvinyl alcohol.

An ink receiving layer preferably contains a hardening agent and a surface active agent in addition to the hydrophilic polymer. Further, in order to prevent blocking, a filler such as a matting agent may be added in an appropriate amount to not form pores.

On the other hand, using a porous type ink receiving layer of this invention is preferable from the point of view of much reduced color bleed.

The porous type ink receiving layer used in this invention is preferably comprised of a majority of fine particles and a hydrophilic binder.

Employed as fine particles usable in the present invention may be fine inorganic and organic particles. However, fine inorganic particles are particularly preferred, since high gloss as well as high color density is thereby obtained, and in addition, fine particles are easily prepared. Listed as said inorganic particles may be, for example, white inorganic pigment such as light precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthetic non-crystalline silica, colloidal silica, alumina, colloidal alumina, pseudo-boehmite, aluminum hydroxide, lithopone, zeolite, and magnesium hydroxide. The foregoing fine inorganic particles may be employed as primary particles, as well as in a state in which secondary coagulated particles are formed.

In the present invention, from the viewpoint of preparing high quality prints utilizing ink-jet recording sheets, preferred as fine inorganic particles are alumina, pseudo-boehmite, colloidal silica, and fine silica particles synthesized by a gas phase method.

Of these, hydrated alumina is preferable from the view point of preventing bleeding of printed images under high humidity conditions. A typical example of this pseudo-boehmite is hydrated alumina A described in an example of JP-A 7-89221. This hydrated alumina A is prepared by the following steps: firstly, aluminum alkoxide is produced via the method described in U.S. Pat. No. 4,242,271, after which the foregoing aluminum alkoxide is hydrolyzed with the method described in U.S. Pat. No. 4,202,870 and aged at 30° C. for 2 hrs. to obtain an alumina colloidal sol. This hydrated alumina A is amorphous and tabular, and its BET specific surface area is 76 g/m and the BET pore volume is 0.57 ml/g.

It is supposed the reason that pseudo-boehmite has high ink absorbability is that the pore diameters and pore diameter distribution are in extremely appropriate ranges for ink absorption. The pore diameter distribution of pseudo-boehmite has more than 2 local maximal values. The relatively large pores absorb solvent components in ink, and relatively small pores absorb dyes in the ink. One local maximum of pore diameter distribution of pseudo-boehmite is preferably 10 nm or less of pore diameters, and more preferably 1–6 nm. The other maximum pore diameter is preferably in the range of 10–20 nm.

In the present invention, of these foregoing fine inorganic particles, the most preferred are fine silica particles synthesized employing a gas phase method. From the viewpoints of color bleeding, glossiness, image density and cost, fine silica particles are preferable. Said silica synthesized employing a gas phase method, whose surface is modified with aluminum, may be employed. The content ratio of aluminum employed in the gas phase method silica, whose surface is modified with aluminum, is preferably from 0.05–5% by weight with respect to the total silica.

The diameter of the foregoing fine inorganic particles is not particularly limited, however, the average diameter is preferably no more than 1 $\mu$m. When the diameter is at most 1 $\mu$m, the resulting glossiness and color forming properties tend to be good. Therefore, the diameter is more preferably at most 0.2 $\mu$m, and is still more preferably at most 0.1 $\mu$m. The lower limit of the diameter is not particularly restricted, however, from the viewpoint of producing the desired fine inorganic particles, the lower limit is preferably at least approximately 0.003 $\mu$m, and is more preferably at least 0.005 $\mu$m.

The average diameter of the foregoing fine inorganic particles of this invention is obtained as follows. The cross-section and surface of a porous type ink receiving layer are observed employing an electron microscope, whereby the diameter of 100 randomly selected particles is determined. Then, the average diameter is obtained as a simple average (being a number average), based on the obtained data. Herein, each particle diameter is the diameter of a circle having the same area as the projection area of each particle.

Further, from the viewpoint of glossiness and color forming properties, the degree of dispersion of fine particles is preferably at most 0.5. When the degree of dispersion is at most 0.5, the resulting glossiness and color forming properties during printing tend to be good. The degree of dispersion is specifically at most 0.3. The degree of dispersion of fine particles, as described herein, refers to the value obtained by dividing the standard deviation of the particle diameter by the average particle diameter, which is determined by observing the fine particles of the porous layer in the same manner as for determining the foregoing average particle diameter.

Fine particles may be located in the porous layer in the form of primary particles which are not subjected to any modification, secondary particles, or higher order coagulated particles. However, the average particle diameter refers to the average diameter of particles which form independent particles in the porous layer when observed via an electron microscope.

The content of the fine particles in the water-soluble coating composition is preferably 5–40 weight %, and is specifically preferably 7–30 weight %.

Hydrophilic binders incorporated in the porous layer are not particularly limited, and any of those which are conventionally known in the art, may be employed. For example, employed may be gelatin, polyvinylpyrrolidone, polyethylene oxide, polyacrylamide, and polyvinyl alcohol. Of these, polyvinyl alcohol is specifically preferred.

Polyvinyl alcohol exhibits an interaction with fine inorganic particles to result in a high bonding force of fine inorganic particles. Further, polyvinyl alcohol is a polymer whose hygroscopic properties exhibit a relatively small dependence on humidity, and whose contraction stress during coating and drying is also relatively small. As a result, polyvinyl alcohol is excellent in minimizing cracking during coating and drying, which is a problem to be solved by the present invention. Polyvinyl alcohol preferably employed in the present invention includes common polyvinyl alcohol, which is prepared by hydrolyzing polyvinyl acetate, and also modified polyvinyl alcohol such as polyvinyl alcohol whose terminals have been subjected to cation modification, as well as anion-modified polyvinyl alcohol having an anionic group.

The average degree of polymerization of the polyvinyl alcohol prepared by hydrolyzing vinyl acetate is preferably at least 300, and is more preferably 1,000–5,000. The saponification ratio of the polyvinyl alcohol is preferably 70–100%, and is more preferably 80–99.5%.

The cation-modified polyvinyl alcohol includes, for example, polyvinyl alcohol which has a primary, secondary or tertiary amino group, or a quaternary ammonium group in the main or side chain of the polyvinyl alcohol, described in JP-A 61-10483. Polyvinyl alcohol is prepared by saponifying the copolymer of an ethylenic unsaturated monomer having a cationic group and vinyl acetate.

Listed as ethylenic unsaturated monomers having a cationic group are, for example, trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl)methacrylamide, hydroxylethyltrimethylammonium chloride, trimethyl-(-methacrylamidopropyl)ammonium chloride, and N-(1,1-dimethyl-3-dimethylaminopropyl)acrylamide.

The desired ratio of a cation-modified group containing monomers of cation-modified polyvinyl alcohol to vinyl acetate is 0.1–10 mol %, and is preferably 0.2–5 mol %.

At least two types of polyvinyl alcohol, which have a different degree of polymerization or a different type of modification, may be employed in combination. Specifically, when polyvinyl alcohol having a degree of polymerization of at least 2,000 is employed, it is preferable that after adding polyvinyl alcohol having a degree of polymerization of at most 1,000, to fine inorganic particle dispersion in an amount of 0.05–10 percent by weight with respect to the fine inorganic particles, and more preferably in an amount of 0.1–5 percent by weight, polyvinyl alcohol having a degree of polymerization of at least 2,000 is added so that no marked increase in viscosity of the resulting mixture occurs.

The ratio of fine particles to the hydrophilic binders of the porous layer is preferably 2–20 times in terms of weight ratio. When the weight ratio is less than factor of two, the void ratio of the porous layer decreases. As a result, it becomes difficult to obtain the desired void volume. In addition, excessive hydrophilic binders swell during ink-jet recording and block the voids, becoming a factor in the decrease of the ink absorption rate. On the other hand, when the ratio exceeds a factor of 10, undesirable cracking tends to occur during coating of a relatively thick porous layer. The ratio of fine particles to the hydrophilic binders is more preferably 2.5–12 times, and is still more preferably 3–10 times.

In the foregoing porous type ink receiving layer using a gas phase method prepared silica, addition of the compounds containing a zirconium atom or an aluminum atom in the molecule is preferable from the view point of reducing color bleeding and bleeding of images.

Listed as specific examples of zirconium atom containing compounds which are usable in the present invention are zirconium oxide, zirconium difluoride, zirconium trifluoride, zirconium tetrafluoride, hexafluorozirconate (such as, potassium salts), heptafluorozirconate (such as, sodium salts, potassium salts and ammonium salts), octafluorozirconate (such as, lithium salts), zirconium fluoride oxide, zirconium dichloride, zirconium trichloride, zirconium tetrachloride, hexachlorozirconate (such as, sodium salts and potassium salts), zirconium chloride (zirconyl chloride), zirconium dibromide, zirconium tribromide, zirconium tetrabromide, zirconium bromide oxide, zirconium triiodide, zirconium tetraiodide, zirconium peroxide, zirconium hydroxide, zirconium sulfate, zirconium p-toluenesulfonate, zirconyl sulfate, sodium zirconyl sulfate, acidic zirconyl sulfate trihydrate, potassium zirconyl sulfate, zirconium selenate, zirconium nitrate, zirconyl nitrate, zirconium phosphate, zirconyl carbonate, ammonium zirconyl carbonate, zirconium acetate, zirconyl acetate, ammonium zirconyl acetate, zirconyl lactate, zirconyl citrate, zirconyl stearate, zirconyl phosphate, zirconium oxalate, zirconium isopropirate, zirconium butyrate, zirconium acetylacetonate, and bis(acetylacetonato) dichlorozirconium, as-well as tris(acetylacetonato) chlorozirconium.

Of these compounds, generally preferred are zirconyl carbonate, ammonium zirconyl carbonate, zirconyl acetate, zirconyl nitrate, zirconium chloride, zirconium lactate, and zirconyl citrate, and specifically preferred are ammonium zirconyl carbonate and zirconyl acetate.

Specific examples of aluminum atom containing compounds which are usable in the present invention do not include aluminum oxide, but include aluminum fluoride, hexafluoroaluminate (such as, potassium salts), aluminum chloride, basic aluminum chloride (such as, polyaluminum chloride), tetrachloroaluminate (such as, sodium salts), aluminum bromide, tetrabromoaluminate (such as, potassium salts), aluminum iodide, aluminate (such as, sodium salts, potassium salts, and calcium salts), aluminum chlorate, aluminum perchlorate, aluminum thiocyanate, aluminum sulfate, basic aluminum sulfate, aluminum sulfate potassium (alum), ammonium aluminum sulfate (ammonium alum), sodium aluminum sulfate, aluminum phosphate, aluminum nitrate, aluminum hydrogenphosphate, aluminum carbonate, polyaluminum silicate sulfate, aluminum formate, aluminum acetate, aluminum lactate, aluminum oxalate, aluminum isopropirate, aluminum butyrate, ethyl acetate aluminum diisopropirate, aluminum tris(acrtylacetonate), aluminum tris(ethylacetoacetate), and aluminum monoacetylacetonatebis(ethylacetoacetonate).

Of these, preferred are aluminum chloride, basic aluminum chloride, aluminum sulfate, basic aluminum sulfate, and basic aluminum sulfate silicate, and more specifically preferred are basic aluminum chloride and basic aluminum sulfate.

The foregoing compounds are usually used in the range of 0.05–25 mmol per m² of the ink-jet recording sheet, more preferably 0.23–10 mmol, and specifically preferably 0.5–5 mmol.

In the porous type ink receiving layer using silica, preferred to reduce color bleed is addition of silane coupling agents.

As silane coupling agents, preferred are quaternary ammonium salts and compounds having a di- or tri-alkoysilanyl group. Examples of preferable silane coupling agents include (a) 3-(trimethoxysilyl) propyldimethyloctadecylammonium chloride, (b) N-β-(N-vinylbenzylaminoethyl)-γ-aminopropyltrimethoxysilane, (c) 3-(trimethoxysilyl) propyldimethylhydroxyethylammonium chloride, and (d) silane coupling agents having an amidazole group. Formulas of these compounds are shown below.

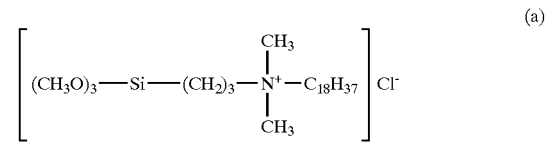

(a)

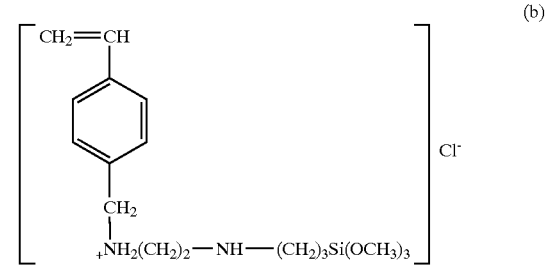

(b)

(c)

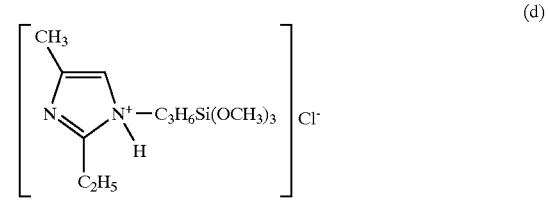

(d)

Hardening of the foregoing silane coupling agents is achieved by forming a cross-linkage structure which results from bonding of silane coupling agents with each other in a condensation reaction (preferably by heating), after plural alkoxysilanyl groups change to silanol groups under the presence of water (ambient moisture in air is adequate).

These cationic compounds may cause coagulation by interacting with anionic charges in the surface of the fine inorganic particles such as silica, when added to a transparent porous layer coating composition. However, when the cations in compounds are contained in a cross-linkage agent coating composition, the coagulation problem does not occur, and thus, it is possible to add effective doses to achieve the desired effect of enhancing film property of the transparent porous layer, without said problems. The added amount of the cationic compound is preferably 0.01–3.6 g/m$^2$, and more preferably about 0.05–2 g/m$^2$.

Employed as substrates used in the ink-jet recording medium of the present invention may be water absorptive substrates (such as, paper) and non-water absorptive substrates, but from the viewpoint of making it possible to obtain still higher quality prints, non-water absorptive substrates are more preferred.

When water absorptive substrates are employed, it becomes difficult to obtain high quality prints. In addition, the components of some additive, which has been overcoated, diffuse into the paper after coating whereby the original effects of the additive are largely lost.

Listed as preferably employed non-water absorptive substrates are, for example, polyester type films, diacetate type films, triacetate type films, polyolefin type films, acryl type films, polycarbonate type films, polyvinyl chloride type films, and polyimide type films, and transparent or opaque films comprised of materials such as cellophane and celluloid, as well as resin coated papers or so-called RC papers which are prepared by covering both sides of a base paper with a polyolefin resin covering layer.

Various types of additives may be incorporated into the water-soluble coating compositions which form these porous type ink receiving layers. Listed such the additives are, for example, cationic mordants, cross-linking agents, surface active agents (being cationic, nonionic, anionic, or amphoteric), background color modifiers, fluorescent brightening agents, biocides, viscosity controlling agents, low-boiling-point organic solvents, high-boiling-point organic solvents, latex emulsions, anti-discoloring agents, UV absorbents, multivalent metallic compounds, (being water-soluble or water-insoluble), matting agents, and silicone oil. Of these, cationic mordants are preferred to enhance water fastness and moisture resistance after printing.

Employed as these cationic mordants are polymer mordants having a primary, secondary, or tertiary amino group or a quaternary ammonium salt group. Of these, polymer mordants having a quaternary ammonium salt group are preferred, which result in minimal discoloration and minimal degradation of light fastness during storage.

The preferred mordants are prepared as either homopolymers of monomers featuring the foregoing quaternary ammonium salt group, and copolymers or condensation polymers of these monomers with other monomers.

Further, it is specifically preferable to incorporate cross-linking agents of hydrophilic binders. By employing such cross-linking agents, the water fastness of the porous type ink receiving layer is enhanced, and in addition, the ink absorption rate is also enhanced during ink-jet recording due to the fact that the swelling of hydrophilic binders is retarded.

Employed as cross-linking agents may be those known in prior art, which include inorganic cross-linking agents (for example, chromium compounds, aluminum compounds, zirconium compounds, and boric acids), and also organic cross-linking agents (such as, epoxy type cross-linking agents, isocyanate type cross-linking agents, aldehyde type cross-linking agents, N-methylol type cross-linking agents, acryloyl type cross-linking agents, vinylsulfone type cross-linking agents, active halogen type cross-linking agents, carbodiimide type cross-linking agents, and ethyleneimino type cross-linking agents).

The content ratio of these cross-linking agents is commonly about 1–50 weight % with respect to the hydrophilic binder, and preferably 2–40 weight %.

When hydrophilic binders are comprised of polyvinyl alcohols and fine particles are comprised of silica, specifically preferred as cross-linking agents are inorganic cross-linking agents such as boric acids and zirconium compounds, and also epoxy type cross-linking agents.

In the preparation of a recording medium of the present invention, a suitable coating method is selected from among the several methods known in the art. Preferably employed coating methods include, for example, a gravure coating method, a roll coating method, a rod/bar coating method, an air knife coating method, a spray coating method, an extrusion coating method, a curtain coating method, and an extrusion coating method employing a hopper, described in U.S. Pat. No. 2,681,294.

The porous type ink receiving layer based on the recording medium of the present invention may be comprised of a single layer or the multiple layers. In the case of multiple layers, from the viewpoint of reducing production cost, it is preferable that all the layers are coated simultaneously.

EXAMPLES

The present invention will now be exemplified below with examples, but is not limited to these examples.

Example 1

Preparation of Recording Medium 1

Preparation of Silica Dispersions D1 and D2

While stirring at 3,000 rpm, added at room temperature to 110 L of aqueous solution C1 (at a pH of 2.5, and comprising 2 g of anti-foaming agent SN381, manufactured by San Nopco Limited) comprised of 12% of Cationic Polymer P-1, 10% of n-propanol, and 2% of ethanol were 400 L of preliminarily and uniformly dispersed silica dispersion B1 (at a pH of 2.3 and comprising 1% of ethanol) comprising 25% of gas phase method silica (A200, manufactured by Nippon Aerosil Co., Ltd.) at an average primary particle diameter of about 0.012 $\mu$m, and 0.3% of a water-soluble fluorescent brightening agent, Uvitex NFW Liquid (manufactured by Ciba Specialty Chemicals Co.). Subsequently, 54 L of aqueous solution A1 (each having a concentration of 3%) comprising boric acid and borax at a ratio of 1:1 by weight, were slowly added while stirring.

Subsequently, the resulting mixture was dispersed at a pressure of 3,000 N/cm$^2$ using a high pressure homogenizer, manufactured by Sanwa Industries Co., after which the total volume was brought to 630 L with water, to obtain an almost transparent Silica Dispersion D1.

Further, while stirring at 3,000 rpm, added at room temperature to 120 L of aqueous solution C2 (at a pH of 2.5) comprising 12% of Cationic Polymer P-2, 10% of n-propanol, and 2% of ethanol, were 400 L of the foregoing silica dispersion B1, and subsequently, 52 L of the foregoing aqueous solution A1 was slowly added while stirring.

Subsequently, the resulting mixture was dispersed at a pressure of 3,000 N/cm$^2$ using a high pressure homogenizer, manufactured by Sanwa Industries Co., after which the total volume was brought to 630 L with water, to obtain an almost transparent Silica Dispersion D2.

Each of the foregoing Silica Dispersions D1 and D2 was filtered employing a TCP-30 type filter, having a filtration accuracy of 30 μm, manufactured by Advantech Toyo Kaisha, Ltd.

Preparation of Oil Dispersion Solution

20 Kg of diisodecyl phthalate and 20 Kg of an anti-oxidizing agent (AO-1) were dissolved in 45 Kg of ethyl acetate while heating, after which, mixed to 210 L of a gelatin aqueous solution containing 8 Kg of an acid process gelatin, were 2.9 Kg of cationic polymer P-1 and 10.5 Kg of saponin at 55° C., after that the mixture was emulsify-dispersed using a high pressure homogenizer. The total volume was then adjusted to 300 L with water, whereby an Oil Dispersion Solution was prepared.

Cationic Polymer P-1

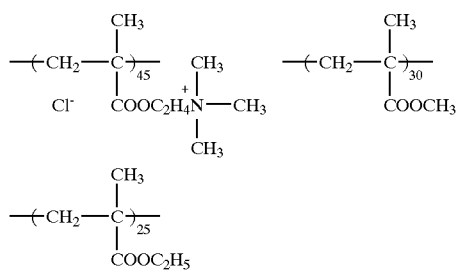

Cationic Polymer P-2

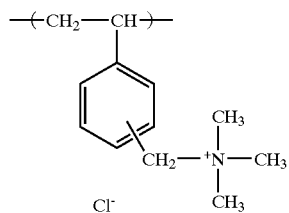

Anti-oxidizing Agent (AO-1)

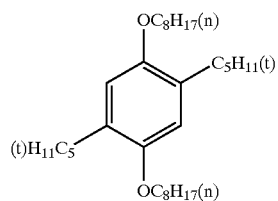

Preparation of Coating Compositions

Coating compositions were prepared by successively adding each of the additives described below to each of the dispersions prepared as above. Each additive amount is expressed per L of the coating composition.

| First layer Coating Composition: Lowermost Layer | |
|---|---|
| Silica Dispersion D1 | 580 ml |
| 10% aqueous solution of polyvinyl alcohol (PVA 203, produced by Kuraray Co., Ltd.) | 5 ml |
| 6.5% aqueous solution of polyvinyl alcohol (having an average degree of polymerization of 3,800 and a saponification ratio of 88%) | 290 ml |
| Oil Dispersion | 30 ml |
| Latex dispersion (AE803, produced by Showa Highpolymer Co., Ltd.) | 42 ml |
| Ethanol | 8.5 ml |
| Water to make | 1,000 ml |
| Second Layer Coating Composition | |
| Silica Dispersion D1 | 600 ml |
| 10% aqueous solution of polyvinyl alcohol (PVA 203, produced by Kuraray Co., Ltd.) | 5 ml |
| 6.5% aqueous solution of polyvinyl alcohol (having an average degree of polymerization of 3,800 and a saponification ratio of 88%) | 270 ml |
| Oil Dispersion | 20 ml |
| Latex dispersion (AE 803, produced by Showa Highpolymer Co., Ltd.) | 22 ml |
| Ethanol | 8 ml |
| Water to make | 1,000 ml |
| Third Layer Coating Composition | |
| Silica Dispersion D2 | 630 ml |
| 10% aqueous solution of polyvinyl alcohol (PVA 203, produced by Kuraray Co., Ltd.) | 5 ml |
| 6.5% aqueous solution of polyvinyl alcohol (having an average degree of polymerization of 3,800 and a saponification ratio of 88%) | 270 ml |
| Oil Dispersion | 10 ml |
| Latex dispersion (AE 803, produced by Showa Highpolymer Co., Ltd.) | 5 ml |
| Ethanol | 3 ml |
| Water to make | 1,000 ml |
| Fourth Layer Coating Composition: Uppermost Layer | |
| Silica Dispersion D2 | 660 ml |
| 10% aqueous solution of polyvinyl alcohol (PVA 203, produced by Kuraray Co., Ltd.) | 5 ml |
| 6.5% aqueous solution of polyvinyl alcohol (having an average degree of polymerization of 3,800 and a saponification ratio of 88%) | 250 ml |
| 4% aqueous solution of Betaine Type Surface Active Agent-1 | 3 ml |
| 25% aqueous solution of saponin | 2 ml |
| Ethanol | 3 ml |
| Water to make | 1,000 ml |

Betaine Type Surface Active Agent-1

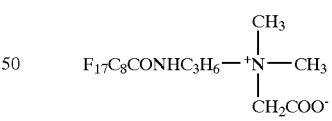

Each coating composition, prepared as above, was filtered employing a TCPD-30 filter having a filtration accuracy of 20 μm, manufactured by Advantech Toyo Kaisha, Ltd. and subsequently filtered employing a TCPD-10 filter.

Coating of Recording Medium

Subsequently, four layers were simultaneously applied at 40° C. onto a paper substrate both sides of which were laminated with polyethylene, employing a slide hopper type coater so that each of the coating compositions resulted in the wet layer thickness described below.

| Wet Layer Thickness | |
|---|---|
| First Layer: | 42 μm |
| Second Layer: | 39 μm |
| Third Layer: | 44 μm |
| Fourth Layer: | 38 μm |

Employed as the paper substrate was a 1.5 m wide and approximately 4,000 m long substrate wound onto a roll.

The paper substrate was prepared as described below. Polyethylene comprising 6% of anatase type titanium oxide was extruded at a thickness of 35 μm and melt-coated onto the surface of a 170 g/m² photographic base paper, having a water content of 8%, while polyethylene was extruded at a thickness of 40 μm and melt-coated onto the opposite surface. The surface was subjected to corona discharge and subsequently, coated with a sublayer so that the coated weight of polyvinyl alcohol (PVA 235, produced by Kuraray Co., Ltd.) was 0.05 g per m² of the recording sheet. The opposite surface was also subjected to a corona discharge treatment and was coated with a backing layer comprising approximately 0.4 g of a styrene-acrylate type latex binder having a Tg of approximately 80° C., 0.1 g of an antistatic agent (being a cationic polymer), and 0.1 g of approximately 2 μm silica as a matting agent.

After coating the ink receiving layer coating composition, drying of the resulting coating was performed by passage through a cooling zone maintained at 5° C. for 15 seconds to lower the temperature of the coated surface to 13° C., after which the resulting coating was passed through several zones in which air was successively blown at optimal temperatures, and subsequently wound into a roll, whereby Recording Medium 1 was prepared.

Preparation of Recording Medium 2

Recording Medium 2 was prepared in the same manner as Recording Medium 1 except that instead of the fourth layer coating composition, a translucent coating composition the total volume of which was finally brought to 1,000 ml by adding water, after gradual addition of a 20% aqueous solution of 13.1 mmol of zirconyl acetate (at a molecular weight of 215), followed by addition of 0.01 mmol zirconyl nitrate aqueous solution before the fourth layer coating composition was diluted volume with water.

Preparation of Recording Medium 3

Recording Medium 3 was prepared in the same manner as Recording Medium 1 except that instead of the fourth layer coating composition, a coating composition the total volume of which was finally brought to 1,000 ml by adding water, after addition of 3 g of basic aluminum polyhydroxide (Pyurakemu WT, produced by Rikengreen Co., Ltd.) before the fourth layer coating composition volume was diluted with water.

Preparation of Recording Medium 4

Recording Medium 4 was prepared by coating and drying of the following overcoat composition at 20 g/m² onto the ink receiving layer of Recording Medium 1.

Overcoat Composition 97.8 parts of water, 0.2 parts of a surface active agent (F-144D, produced by Dainippon Ink and Chemicals, Inc.), and 1 part of cationic silane coupling agent POLON-MF-50, produced by Shin-Etsu Chemical Co., Ltd.) were added to 1 part of borax, and stirred to obtain said Overcoat Composition.

Preparation of Inks 1 Through 18

The following components were mixed and stirred adequately, after which the mixture was filtered using a 0.45 μm pore membrane filter, to obtain Ink 1.

| | |
|---|---|
| Foregoing compound M-1 | 4.0 weight % |
| Glycerin | 10.0 weight % |
| 1,2-pentandiol | 5.0 weight % |
| Proxel GXL (D) (produced by Avecia KK) | 0.1 weight % |
| Ion exchanged water | 80.9 weight % |

Further, each of the other inks as described in Table 1 compositions was prepared in the same manner as Ink 1.

Preparation of Image Recorded Samples

Ink 1 was applied to an on-demand type ink jet printer which had a nozzle diameter of 23 μm, a driving frequency of 5 kHz, 128 nozzles, and a nozzle density of 90 dpi (hereinafter, the term of dpi refers to dot numbers per 2.54 cm, e.g., dots per inch), and further Recording Medium 1 was loaded as a recording medium, to prepare Image Recorded Sample 1 of a solid image of 10 cm×10 cm. In the same way, Image Recorded Samples 2 through 14 were prepared changing Ink 1 to Inks 2 through 14 respectively.

Similarly, Recording Media 2 through 4 were loaded into the ink jet printer, and thus Image Recorded Samples were prepared using Inks 2 through 14.

As the comparative samples, Image Recorded Samples were prepared by outputting images onto each recording medium in the same manner using Inks 15 through 18, each of which had the components described in Table 1.

TABLE 1

| Ink No. | Dye 1 | Amount of Dye 1 | Dye 2 | Amount of Dye 2 | Solvent No. 1 | 2 | 3 | 4 | 5 | Solvent No. | Amount | 16 | 17 | 18 | 19 | 20 | Remarks |
|---|---|---|---|---|---|---|---|---|---|---|---|---|---|---|---|---|---|
| 1 | M-1 | 4.0 | | | | | 10.0 | | | 6 | 5.0 | | | | 0.1 | 80.9 | Inv. |
| 2 | M-4 | 4.4 | | | | 15.0 | | | | 12 | 10.0 | | | | | 70.6 | Inv. |
| 3 | M-2 | 4.0 | | | 15.0 | | | 10.0 | | — | — | | | 0.5 | 0.1 | 70.4 | Inv. |
| 4 | M-5 | 4.1 | | | | 20.0 | | | 5.0 | 15 | 0.1 | | | | 0.1 | 70.8 | Inv. |
| 5 | M-1 | 3.5 | | | 10.0 | 10.0 | | | 10.0 | 7 | 10.0 | | | | | 56.5 | Inv. |
| 6 | M-4 | 4.2 | | | 10.0 | 10.0 | 5.0 | | | 8 | 10.0 | | | | 0.1 | 60.7 | Inv. |
| 7 | M-2 | 3.2 | M-5 | 1.6 | 10.0 | | 10.0 | | | 10 | 10.0 | | | | | 65.2 | Inv. |
| 8 | M-1 | 2.8 | M-4 | 2.8 | | 10.0 | 10.0 | | | 11 | 10.0 | | | | 0.1 | 64.5 | Inv. |
| 9 | M-3 | 2.8 | M-5 | 1.4 | 10.0 | | 10.0 | | | 13 | 8.0 | | | | | 67.8 | Inv. |
| 10 | M-1 | 2.0 | M-4 | 2.0 | | 10.0 | 10.0 | | | — | — | | | 1.0 | 0.2 | 74.9 | Inv. |
| 11 | M-2 | 3.3 | M-6 | 1.7 | | | | 5.0 | 10.0 | 14 | 2.0 | 1.0 | | | 0.1 | 76.9 | Inv. |
| 12 | M-3 | 1.7 | M-5 | 3.3 | | | 10.0 | | 15.0 | 9 | 5.0 | 1.0 | | | 0.1 | 63.9 | Inv. |

TABLE 1-continued

| Ink No. | Dye 1 | Amount of Dye 1 | Dye 2 | Amount of Dye 2 | 1 | 2 | 3 | 4 | 5 | Solvent No. | Amount | 16 | 17 | 18 | 19 | 20 | Remarks |
|---|---|---|---|---|---|---|---|---|---|---|---|---|---|---|---|---|---|
| 13 | M-3 | 3.0 | M-4 | 1.5 |  | 10.0 | 10.0 |  |  | 9 | 10.0 | 1.5 |  |  |  | 64.0 | Inv. |
| 14 | M-2 | 1.3 | M-4 | 2.7 | 24.0 |  |  | 22.0 |  | — | — |  | 1.0 |  | 0.1 | 48.9 | Inv. |
| 15 | M-2 | 1.0 | M-6 | 4.0 | 20.0 |  | 10.0 |  |  | — | — |  |  |  |  | 65.0 | Inv. |
| 16 | M-2 | 2.0 | M-4 | 2.0 |  | 15.0 |  | 20.0 |  | — | — |  |  |  | 0.1 | 60.9 | Inv. |
| 17 | M-8 | 3.2 |  |  |  | 10.0 | 10.0 |  |  | 9 | 10.0 | 1.5 |  |  | 0.1 | 65.2 | Comp. |
| 18 | M-7 | 2.5 |  |  |  |  | 10.0 |  | 15.0 | 7 | 10.0 | 1.0 |  |  |  | 61.5 | Comp. |

Inv.; Present Invention
Comp.; Comparative Example

M-7

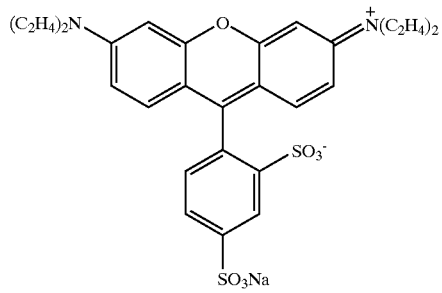

M-8

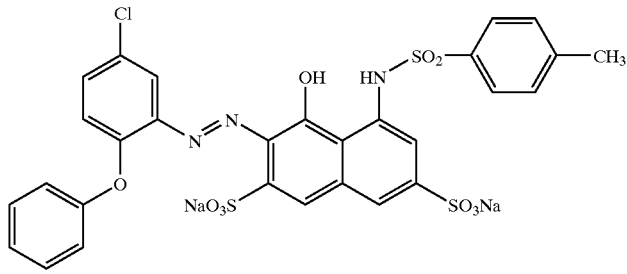

Solvents shown in Table 1 are listed below.
Solvent 1: ethylene glycol
Solvent 2: diethylene glycol
Solvent 3: glycerin
Solvent 4: propylene glycol
Solvent 5: tripropylene glycol
Solvent 6: 1,2-pentanediol
Solvent 7: 1,2-hexanediol
Solvent 8: triethylene glycol monomethyl ether
Solvent 9: triethylene glycol monobutyl ether
Solvent 10: propylene glycol butyl ether
Solvent 11: tripropylene glycol monomethyl ether
Solvent 12: 2-methy-1,3-pronanediol
Solvent 13: 2-methylpentane-2,4-diol
Solvent 14: 2-propanol
Solvent 15: Surfynol 104
Solvent 16: Surfynol 465
Solvent 17: PLURONIC L62
Solvent 18: PLURONIC L61
Solvent 19: Proxel GXL (D)
Solvent 20: Ion exchanged water Light Stability Evaluation of Image Recorded Samples Each of obtained Image Recorded Samples was measured for magenta density with an X-rite Spectrodensitometer (measuring condition: C light source) after 48 hrs exposure in a Xe Fade-o-Meter and unexposed samples, to evaluate light stability based on the following evaluation criteria.

Residual ratio=(reflection density of exposed sample)/(reflection density of unexposed sample)

A: Residual ratio was 80% or more
B: Residual ratio was between 50%–80%
C: Residual ratio was less than 50%

Color Evaluation of Image Recorded Samples

Each of obtained Image Recorded Samples was visually evaluated for hue based on the following criteria.

A: Desirable magenta color
B: Slightly reddish magenta
C: Slightly bluish magenta
D: color was not magenta The results of evaluation of light stability and color with the above methods are shown in Table 2.

Similarly, Konica Copy Paper NR-A80 and Xerox 4024 copy paper (produced by Xerox Corp.) were loaded into the above ink jet printer as plain paper recording media, to prepare Image Recorded Samples using Inks 1 through 18 respectively. Plain Paper Bleeding Evaluation of Image Recorded Samples In each of the obtained Image Recorded Samples, the boundary between printed area and non-printed area was visually evaluated for bleeding based on the following criteria.

A: No bleeding
B: Slightly uneven bleeding was observed
C: Heavy uneven bleeding was observed The results of evaluation of light stability, color and plain paper bleeding with the above methods are shown in Table 2.

TABLE 2

| Ink No. | Recording Medium 1 *1 | Color | Recording Medium 2 *1 | Color | Recording Medium 3 *1 | Color | Recording Medium 4 *1 | Color | NR-A80 *1 | Color | Bleeding | Xerox 4024 *1 | Color | Bleeding | Remarks |
|---|---|---|---|---|---|---|---|---|---|---|---|---|---|---|---|
| 1 | A | C | A | C | A | C | A | C | A | C | A | A | C | A | Inv. |
| 2 | A | B | A | B | A | B | A | B | B | B | A | B | B | A | Inv. |
| 3 | A | C | A | C | A | C | A | C | A | C | A | A | C | A | Inv. |
| 4 | A | B | A | B | A | B | A | B | B | B | A | B | B | A | Inv. |
| 5 | A | C | A | C | A | C | A | C | A | C | A | A | C | A | Inv. |
| 6 | A | B | A | B | A | B | A | B | B | B | A | B | B | A | Inv. |
| 7 | A | A | A | A | A | A | A | A | A | A | A | A | A | A | Inv. |
| 8 | A | A | A | A | A | A | A | A | A | A | A | A | A | A | Inv. |
| 9 | A | A | A | A | A | A | A | A | A | A | A | A | A | A | Inv. |
| 10 | A | A | A | A | A | A | A | A | A | A | A | A | A | A | Inv. |
| 11 | A | A | A | A | A | A | A | A | A | A | A | A | A | A | Inv. |
| 12 | A | A | A | A | A | A | A | A | A | A | A | A | A | A | Inv. |
| 13 | A | A | A | A | A | A | A | A | A | A | A | A | A | A | Inv. |
| 14 | A | A | A | A | A | A | A | A | A | A | A | A | A | A | Inv. |
| 15 | A | A | B | A | B | A | B | A | B | A | D | B | A | D | Inv. |
| 16 | B | A | B | A | B | A | B | A | B | A | D | B | A | D | Inv. |
| 17 | D | A | D | A | D | A | D | A | D | A | A | D | A | A | Comp. |
| 18 | D | A | D | A | D | A | D | A | D | A | A | D | A | A | Comp. |

*1; Light stability
Inv.: Present Invention
Comp.: Comparative Example

As is apparent from Table 2, it was proved that the ink of the present invention is superior in light stability, color and reduced plain paper bleeding.

Further, the ink exhibited no problems in a continuous ejection test, and it was confirmed that the ink of the present invention was highly appropriate to the electro-mechanical conversion system.

Further, Image Recorded Samples were prepared using Inks 1 through 18, replacing the printer with Ink-jet Printer MJ-810C (manufactured by Seiko Epson Corporation, an electro-mechanical conversion system), and Recording Media to Recording Medium 3 and Photo Print 2. The evaluated results of light stability and color using the foregoing evaluation methods are shown in Table 3.

Similarly, Image Recorded Samples were prepared using Inks 1 through 18 respectively, and replacing the Recording Medium with Konica Copying Paper NR-A80 (produced by Konica Corp.). The evaluated results of light stability, color and plain paper bleeding with the foregoing evaluation methods were shown in Table 3.

TABLE 3

| Ink No. | Recording Medium 3 *1 | Color | Photo Print 2 *1 | Color | NR-A80 *1 | Color | Bleeding | Remarks |
|---|---|---|---|---|---|---|---|---|
| 1 | A | C | A | C | A | C | A | Inv. |
| 2 | A | B | A | B | B | B | A | Inv. |
| 3 | A | C | A | C | A | C | A | Inv. |
| 4 | A | B | A | B | B | B | A | Inv. |
| 5 | A | C | A | C | A | C | A | Inv. |
| 6 | A | B | A | B | B | B | A | Inv. |
| 7 | A | A | A | A | A | A | A | Inv. |
| 8 | A | A | A | A | A | A | A | Inv. |
| 9 | A | A | A | A | A | A | A | Inv. |
| 10 | A | A | A | A | A | A | A | Inv. |
| 11 | A | A | A | A | A | A | A | Inv. |
| 12 | A | A | A | A | A | A | A | Inv. |
| 13 | A | A | A | A | A | A | A | Inv. |
| 14 | A | A | A | A | A | A | A | Inv. |
| 15 | A | A | B | A | B | A | D | Inv. |
| 16 | B | A | B | A | B | A | D | Inv. |
| 17 | D | A | D | A | D | A | A | Comp. |
| 18 | D | A | D | A | D | A | A | Comp. |

*1; Light stability
Inv.: Present Invention
Comp.: Comparative Example

As is apparent from Table 3, it is proved that the ink of the present invention is superior in light stability, color and reduced plain paper bleeding.

Further, the ink exhibited no problems in a continuous ejection test, and it was confirmed that the ink jet recording solution of the present invention was highly appropriate to the electro-mechanical conversion system.

Preparation of Inks 19 Through 36

The following components were mixed and stirred adequately, after which the mixture was filtered using a 0.45 μm pore membrane filter, to obtain Ink 19.

| | |
|---|---|
| The foregoing compound M-2 | 5.0 weight % |
| Ethylene glycol | 10.0 weight % |
| 2-methylpentane-2,4-diol | 5.0 weight % |
| Ion exchanged water | 75.0 weight % |

Further, Inks 20 through 36 described in Table 4 were prepared in the same manner as Ink 19.

TABLE 4

| Ink No. | Dye 1 | Added amount of Dye 1 | Dye 2 | Added amount of Dye 2 | 1 | 2 | 3 | 4 | 5 | Solvent No. | Added amount | 15 | 16 | 17 | 18 | 19 | 20 | Remarks |
|---|---|---|---|---|---|---|---|---|---|---|---|---|---|---|---|---|---|---|
| 19 | M-2 | 5.0 |  |  | 10.0 |  |  |  | 5.0 | 13 | 5.0 |  |  |  |  |  | 75.0 | Inv. |
| 20 | M-5 | 4.0 |  |  |  | 7.0 |  | 2.0 |  | 11 | 8.0 |  |  |  |  | 0.1 | 78.9 | Inv. |
| 21 | M-1 | 3.8 |  |  |  |  |  | 5.0 |  | 6 | 5.0 |  |  |  |  | 0.1 | 86.1 | Inv. |
| 22 | M-4 | 3.5 |  |  | 2.0 | 2.0 | 2.0 |  |  | 13 | 8.0 |  |  |  |  | 0.1 | 82.4 | Inv. |
| 23 | M-3 | 4.2 |  |  |  | 10.0 |  |  |  | 12 | 10.0 |  |  |  |  |  | 75.8 | Inv. |
| 24 | M-4 | 4.3 |  |  | 5.0 | 5.0 | 5.0 |  |  | — | — |  | 2.0 |  |  |  | 78.7 | Inv. |
| 25 | M-1 | 2.0 | M-4 | 2.5 | 10.0 |  | 5.0 |  |  | 14 | 2.0 |  | 2.0 |  |  | 0.1 | 76.4 | Inv. |
| 26 | M-2 | 2.5 | M-4 | 2.0 |  |  |  | 5.0 | 5.0 | 9 | 5.0 |  |  | 1.0 |  | 0.1 | 79.5 | Inv. |
| 27 | M-3 | 1.0 | M-5 | 4.0 | 5.0 |  | 5.0 |  |  | 6 | 5.0 |  |  |  |  |  | 80.0 | Inv. |
| 28 | M-3 | 2.5 | M-6 | 2.5 |  |  |  |  | 8.0 | 7 | 4.0 | 0.1 | 1.0 |  |  | 0.2 | 81.8 | Inv. |
| 29 | M-2 | 2.8 | M-4 | 2.2 |  |  | 5.0 |  |  | 8 | 10.0 | 0.1 |  |  |  | 0.1 | 79.9 | Inv. |
| 30 | M-1 | 4.0 | M-5 | 1.0 | 10.0 |  |  | 5.0 |  | 14 | 1.0 |  | 2.0 |  |  |  | 77.0 | Inv. |
| 31 | M-1 | 2.1 | M-4 | 2.3 | 3.0 | 3.0 | 7.0 |  |  | — | — |  |  |  | 0.5 |  | 82.2 | Inv. |
| 32 | M-1 | 1.8 | M-4 | 2.6 |  | 10.0 |  |  |  | 10 | 5.0 |  |  |  |  | 0.1 | 80.5 | Inv. |
| 33 | M-1 | 1.5 | M-6 | 4.5 | 10.0 | 10.0 |  |  |  | — | — |  |  |  |  | 0.1 | 73.9 | Inv. |
| 34 | M-2 | 1.8 | M-4 | 2.2 | 5.0 | 5.0 | 5.0 | 5.0 |  | — | — |  |  |  |  |  | 76.0 | Inv. |
| 35 | M-8 | 3.2 |  |  | 10.0 |  |  |  | 5.0 | 13 | 5.0 |  |  |  |  | 0.1 | 76.7 | Comp. |
| 36 | M-7 | 2.5 |  |  | 5.0 | 5.0 | 5.0 |  |  | 14 | 2.0 |  | 2.0 |  |  |  | 78.5 | Comp. |

Inv.: Present Invention
Comp.: Comparative Example

The solvents described in Table 4 are the same as in Table 1, and were the following.

Solvent 1: ethylene glycol
Solvent 2: diethylene glycol
Solvent 3: glycerin
Solvent 4: propylene glycol
Solvent 5: tripropylene glycol
Solvent 6: 1,2-pentanediol
Solvent 7: 1,2-hexanediol
Solvent 8: triethylene glycol monomethyl ether
Solvent 9: triethylene glycol monobutyl ether
Solvent 10: propylene glycol butyl ether
Solvent 11: tripropylene glycol monomethyl ether
Solvent 12: 2-methy-1,3-pronanediol
Solvent 13: 2-methylpentane-2,4-diol
Solvent 14: 2-propanol
Solvent 15: Surfynol 104
Solvent 16: Surfynol 465
Solvent 17: PLURONIC L62
Solvent 18: PLURONIC L61
Solvent 19: Proxel GXL (D)
Solvent 20: Ion exchanged water Image Recorder Samples were prepared using Inks 19 through 36 respectively, replacing the ink jet printer with an Ink-jet Printer BJ S700 manufactured by Canon Inc. (an elecro-thermal conversion system), and using Recording Medium to Recording Medium 1 and PICTRICO PRO (produced by PICTORICO Co., Ltd.). The evaluated results with the foregoing evaluation methods were shown in Table 5.

Similarly, Image Recorded Samples were prepared using Inks 19 through 36 respectively, and replacing the Recording Medium with Konica Copying Paper NR-A80 (produced by Konica Corp.). The evaluated results of light stability, color and reduced plain paper bleeding using the foregoing evaluation methods are shown in Table 5.

TABLE 5

| Ink No. | Recording Medium 1 *1 | Recording Medium 1 Color | PICTORICO PRO *1 | PICTORICO PRO Color | NR-A80 *1 | NR-A80 Color | Bleeding | Remarks |
|---|---|---|---|---|---|---|---|---|
| 19 | A | C | A | C | A | C | A | Inv. |
| 20 | A | B | A | B | B | B | A | Inv. |
| 21 | A | C | A | C | A | C | A | Inv. |
| 22 | A | B | A | B | B | B | A | Inv. |
| 23 | A | C | A | C | A | C | A | Inv. |
| 24 | A | B | A | B | B | B | A | Inv. |
| 25 | A | A | A | A | A | A | A | Inv. |
| 26 | A | A | A | A | A | A | A | Inv. |
| 27 | A | A | A | A | A | A | A | Inv. |
| 28 | A | A | A | A | A | A | A | Inv. |
| 29 | A | A | A | A | A | A | A | Inv. |
| 30 | A | A | A | A | A | A | A | Inv. |
| 31 | A | A | A | A | A | A | A | Inv. |
| 32 | A | A | A | A | A | A | A | Inv. |
| 33 | A | A | B | A | B | A | D | Inv. |
| 34 | B | A | B | A | B | A | D | Inv. |
| 35 | D | A | D | A | D | A | A | Comp. |
| 36 | D | A | D | A | D | A | A | Comp. |

*1; Light stability
Inv.: Present Invention

As is apparent from Table 5, it was proved that the ink of the present invention is superior in light stability, color and reduced plain paper bleeding.

Further, the ink exhibited no any problems in a continuous ejection test, and it was confirmed that the ink of the present invention was highly appropriate to the electro-thermal conversion system.

Further, Image Recorded Samples were prepared using Inks 19 through 36, replacing the printer with an Ink-jet Printer hp cp 1160, manufactured by Hewlett-Packard Co., and Recording Media with Recording Medium 2 and Light-fast Premium Photo Paper (double weight), produced by Hewlett-Packard Co. The evaluated results of light stability and color using the foregoing evaluated methods are shown in Table 6.

Similarly, Image Recorded Samples were prepared using Inks 19 through 36 respectively, and replacing the Recording Medium with Xerox 4024 Copying Paper (produced by Xerox Corp.). The evaluated results of light stability, color and reduced plain paper bleeding using the foregoing evaluation methods are shown in Table 6.

TABLE 6

| Ink No. | Recording Medium 2 *1 | Color | Premium Photo *1 | Color | Xerox4024 *1 | Color | Bleeding | Remarks |
|---|---|---|---|---|---|---|---|---|
| 19 | A | C | A | C | A | C | A | Inv. |
| 20 | A | B | A | B | B | B | A | Inv. |
| 21 | A | C | A | C | A | C | A | Inv. |
| 22 | A | B | A | B | B | B | A | Inv. |
| 23 | A | C | A | C | A | C | A | Inv. |
| 24 | A | B | A | B | B | B | A | Inv. |
| 25 | A | A | A | A | A | A | A | Inv. |
| 26 | A | A | A | A | A | A | A | Inv. |
| 27 | A | A | A | A | A | A | A | Inv. |
| 28 | A | A | A | A | A | A | A | Inv. |
| 29 | A | A | A | A | A | A | A | Inv. |
| 30 | A | A | A | A | A | A | A | Inv. |
| 31 | A | A | A | A | A | A | A | Inv. |
| 32 | A | A | A | A | A | A | A | Inv. |
| 33 | A | A | B | A | B | A | D | Inv. |
| 34 | B | A | B | A | B | A | D | Inv. |
| 35 | D | A | D | A | D | A | A | Comp. |
| 36 | D | A | D | A | D | A | A | Comp. |

*1; Light stability
Inv.: Present Invention
Comp.: Comparative Example

As is apparent from Table 6, it was proved that the ink-jet of the present invention is superior in light stability, color and reduced plain paper bleeding.

Further, the ink exhibited no problems in a continuous ejection test, and it was confirmed that the ink-jet ink of the present invention was highly appropriate to the electrothermal conversion system.

According to the present invention, it is possible to provide ink-jet ink, specifically targeting magenta color ink-jet ink, which exhibits superiority in colored image stability in light and exhibits no bleeding on plain paper.

What is claimed is:

1. An ink-jet ink comprising:

(a) water;

(b) a water-soluble dye represented by Formula (1):

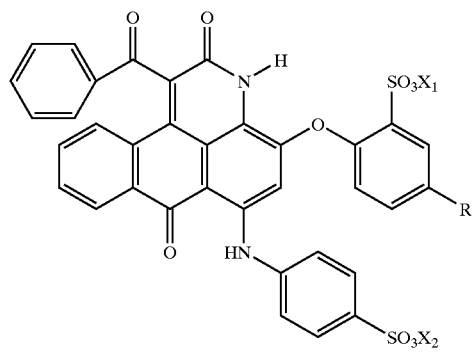

Formula (1)

wherein R represents an alkyl group, each $X_1$ and $X_2$ independently represent an alkali metal, an alkaline earth metal, an alkylamine quaternary salt, an alkanolamine quaternary salt or ammonium, (c) a water-soluble dye represented by Formula (2):

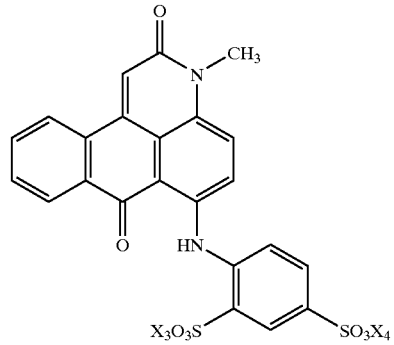

Formula (2)

wherein each $X_3$ and $X_4$ independently represent an alkali metal, an alkaline earth metal, an alkylamine quaternary salt, an alkanolamine quaternary salt or ammonium, wherein a weight ratio of the water-soluble dye represented by Formula (1) to the water-soluble dye represented by Formula (2) is from 1:4 to 4:1; and (d) a water-soluble organic solvent selected from the group consisting of:

(i) a 1,2-alkanediol having 4 carbon atoms or more, (ii) an alkyl ether of diethylene glycol, an alkyl ether of triethylene glycol, an alkyl ether of tetraethylene glycol, an alkyl ether of propylene glycol, an alkyl ether of dipropylene glycol and an alkyl ether of tripropylene glycol, (iii) a divalent alcohol with a branched alkyl chain, (iv) a monovalent alcohol with 1 to 3 carbon atoms.

2. An ink-jet recording method comprising a step of:

jetting the ink of claim 1 onto a surface of a recording medium, wherein the recording medium is a plain paper.

3. An ink-jet recording method comprising a step of:

jetting the ink of claim 1 onto a surface of a recording medium, wherein the recording medium comprises a support having thereon an ink receiving layer comprising a water-soluble binder.

4. The ink-jet recording method of claim 3, wherein the ink receiving layer has a porous structure.

5. The ink-jet recording method of claim 2, wherein the jetting step is conducted with an on-demand process.

6. The ink-jet recording method of claim 5, wherein the jetting step is conducted with an electromechanical conversion method.

7. The ink-jet recording method of claim 5, wherein the jetting step is conducted with an electrothermal conversion method.

8. A recorded material obtained by the method of claim 3.

9. A recorded material obtained by the method of claim 2.

10. An ink-jet ink comprising:

(a) water;

(b) a water-soluble dye represented by Formula (1):

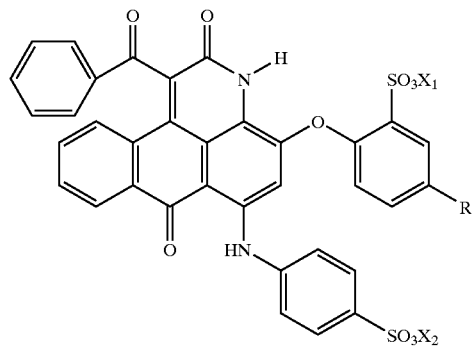

Formula (1)

wherein R represents an alkyl group, each $X_1$ and $X_2$ independently represent an alkali metal, an alkaline earth metal, an alkylamine quaternary salt, an alkanolamine quaternary salt or ammonium, (c) a water-soluble dye represented by Formula (2):

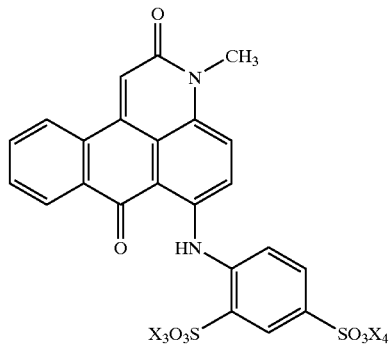

Formula (2)

wherein each $X_3$ and $X_4$ independently represent an alkali metal, an alkaline earth metal, an alkylamine quaternary salt, an alkanolamine quaternary salt or ammonium, wherein a weight ratio of the water-soluble dye represented by Formula (1) to the water-soluble dye represented by Formula (2) is from 1:4 to 4:1;

(d) a water-soluble organic solvent; and (e) a compound selected from the group consisting of:
 (i) acetylene diol or an adduct compound of ethylene oxide with acetylene diol; and
 (ii) an adduct compound of ethylene oxide with polypropylene glycol.

\* \* \* \* \*